United States Patent [19]

Schalch

[11] 4,162,382

[45] Jul. 24, 1979

[54] TRANSPORT DEVICE FOR AN ELECTRICAL RESISTANCE WELDING MACHINE

[75] Inventor: Fred Schalch, Le Landeron, Switzerland

[73] Assignee: Fael S.A., Saint-Blaise, Switzerland

[21] Appl. No.: 846,819

[22] Filed: Oct. 31, 1977

[30] Foreign Application Priority Data

Nov. 9, 1976 [CH] Switzerland ............... 14088/76

[51] Int. Cl.² ............... B23K 1/16; B65G 19/00; B21D 51/26; B23K 37/04
[52] U.S. Cl. ............... 219/64; 219/79; 198/732; 228/49; 113/11 R
[58] Field of Search ............... 219/64, 79; 113/11 R; 228/47, 49 R; 198/732, 734

[56] References Cited

U.S. PATENT DOCUMENTS

| | | | |
|---|---|---|---|
| 2,353,474 | 7/1944 | Kiehn | 198/732 |
| 3,255,945 | 6/1966 | Sillars | 219/64 |
| 3,590,203 | 6/1971 | Gieffers et al. | 219/79 |
| 3,627,106 | 12/1971 | Winfield | 198/732 |

FOREIGN PATENT DOCUMENTS

| | | | |
|---|---|---|---|
| 885228 | 8/1953 | Fed. Rep. of Germany | 198/732 |
| 548455 | 4/1941 | United Kingdom | 198/732 |

*Primary Examiner*—Bruce A. Reynolds
*Assistant Examiner*—Keith E. George

*Attorney, Agent, or Firm*—Charles E. Brown

[57] ABSTRACT

A transport device for use with an electrical resistance welding machine producing longitudinal seams at workpiece bodies or the like which, prior to reaching the welding rolls of the machine, are transported at a desired welding speed by means of the transport device. The transport device comprises at least one endless chain revolving above the workpiece bodies to be transported and having workpiece body-engaging members in the form of pawls hingedly connected in spaced relationship with the endless chain. Each pawl has oppositely extending pawl arms, of which one arm possesses a contact or impact surface intended to bear against the end of a workpiece body engaged thereby and the other arm possesses a control surface which bears against a guide rail stationarily arranged above the lower chain run of the endless chain which revolves over at least two sprocket wheels. The guide rail is constructed at both ends of a linear section thereof so as to have two sections extending in an arc-shaped or curved configuration at the region of the sprocket wheels in such a manner that upon arrival of a pawl in a workpiece feed plane the pawl arm having the contact surface is pivoted in a controlled manner into its workpiece-engagement position and upon departure of the pawl out of the feed plane the contact surface of such pawl arm retains its essentially vertical position with regard to the direction of transport of the workpiece body.

10 Claims, 3 Drawing Figures

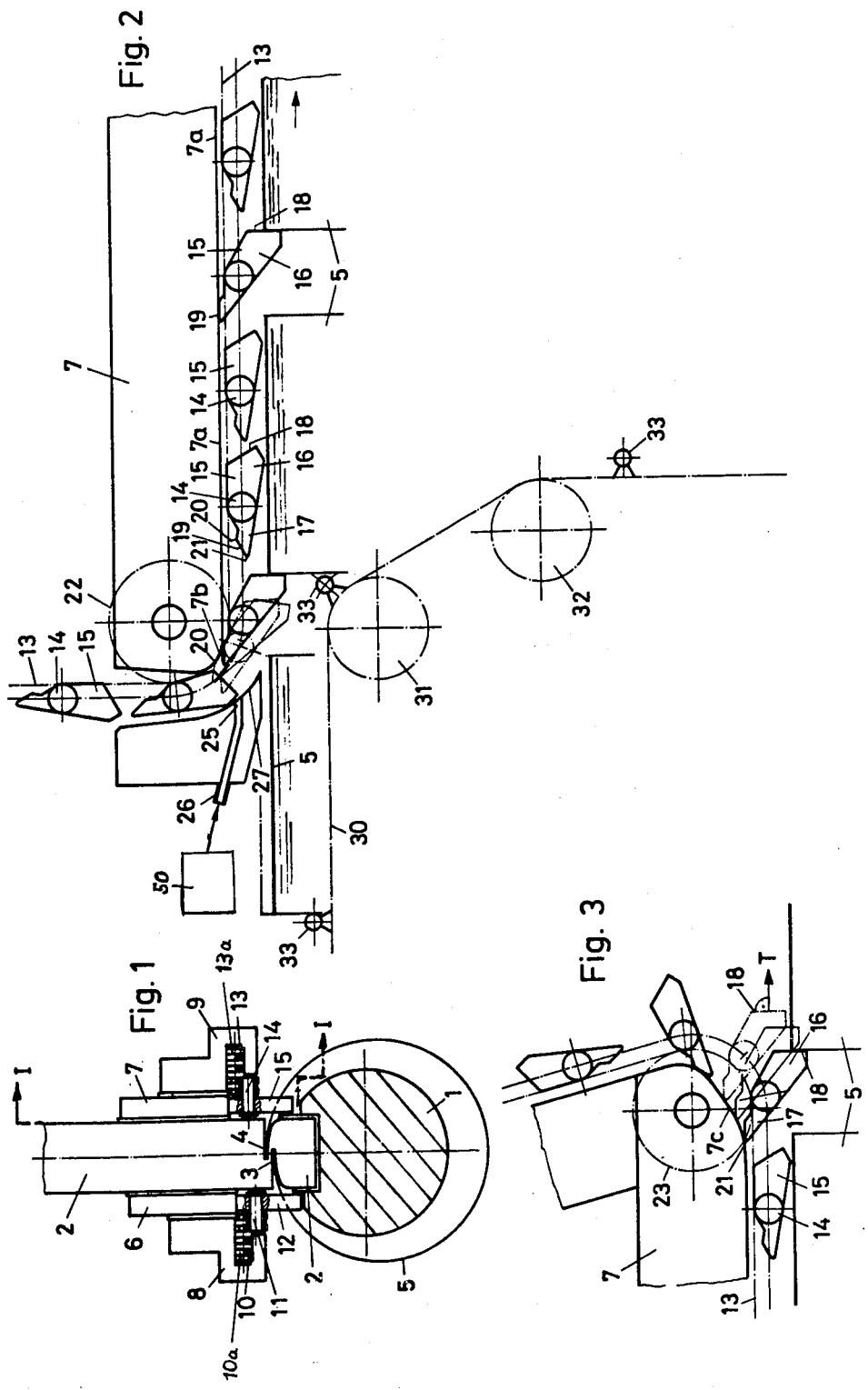

TRANSPORT DEVICE FOR AN ELECTRICAL RESISTANCE WELDING MACHINE

BACKGROUND OF THE INVENTION

The present invention broadly relates to electrical resistance welding machines for producing longitudinal seams at workpieces, typically in the form of workpiece bodies which are destacked in the form of blanks or the like from a blank stack, rounded in a forming machine and delivered to welding or electrode rolls by means of a transport device which transports such bodies at the requisite welding speed before reaching the welding rolls. More specifically, the invention relates to a new and improved construction of such transport device for use with welding equipment, especially electrical resistance welders.

With heretofore known resistance welding machines of the previously mentioned type the transport device possesses entrainment members fixedly arranged on a revolving chain, the entrainment members pushing the workpiece bodies. A notable drawback of such prior art transport device resides in the fact that at the deflection locations of the chain the entrainment members which engage with the workpiece bodies strike against the edge of such bodies, producing undersirable notches or indentations at such edges. These indentations can be extremely disadvantageous during the further processing of the workpiece bodies into cans, for instance when connecting the workpiece body which is no longer of cylindrical configuration due to the indentation or notch, with a can end or closure, and the end seal of such produced can can become impaired due to the presence of such indentation or notch.

A further appreciable drawback of the transport device used with heretofore known resistance welding machines resides in the fact that the mutual spacing of the entrainment members at the chain determines the length of the workpiece bodies which can be transported with the chain. The maximum length of the bodies at most can be somewhat smaller than the spacing between adjacent entrainment members, because the entrainment members themselves need a certain amount of space between two neighboring bodies. If, however, there should be processed at the machine considerably shorter bodies, then the workpiece bodies have an appreciably greater spacing from one another, resulting in poor production output of the machine owing to the idle phases of the production brought about by virtue of the larger body spacing. In order to enhance the poor adaptability of such type of machines when converting the production from one size of workpiece body to another, it has heretofore been proposed to use exchangeable chains each having a different mutual spacing of their entrainment members. This requires, however, that whenever the production is altered that there be undertaken a complicated change-over or restructuring of the machine which, in turn, means that there is an interruption in the production at the machine during such time as one transport chain is exchanged for another.

It is furthermore known to employ for the transport of the bodies to the welding rolls two different transport systems which transport the bodies at different feed or conveying speeds. This measure is justified in terms of the need for imparting to the blanks, prior to accomplishing the continuous welding operation, a continuous feed or conveying speed which coincides with the welding speed, yet however before the welding operation the bodies which first are destacked from a blank stack must be rounded in a forming or rounding machine, and owing to the time which is needed to accomplish this operation the bodies must be intermittently transported both to and from the forming machine, and specifically, at a greater feed or transport speed than the welding speed, so that the blank which previously was delivered at the welding speed to the welding rolls can be closed-in or approached by the next following workpiece body. Hence, a transfer of each of the workpiece bodies as a practical matter must be accomplished by transport systems having two different feed or conveying speeds. For use with the second transport system operating at the lower feed speed there has been proposed a device having pivotable or oscillating levers controlled by a cam for introducing the the bodies between the welding rolls. This device is synchronized with the first transport system which possesses exchangeable chains where the entrainment members are spaced differently from one another. Consequently, also with this transport device which is combined from both transport systems there is only attainable a limited adaptability to different sizes of the workpiece bodies during a conversion in the production.

SUMMARY OF THE INVENTION

Therefore, with the foregoing in mind it is a primary object of the present invention to overcome the previously discussed drawbacks and limitations of the prior art systems.

Another and more specific object of the present invention is concerned with avoiding the previously considered drawbacks of the state-of-the-art resistance welding equipment, and providing a transport device therefor which is capable of transporting the workpieces without danger of damaging or notching the edges of the workpieces by the entrainment members, and further, wherein such transport device is suitable for transporting workpieces of different size without having to carry out any conversions at the transport device or having to exchange one type chain for another.

Still a further significant object of the present invention aims at the provision of a new and improved construction of transport device for use with welding equipment for feeding workpieces to be welded to the welding station at a desired welding speed, which transport device is relatively simple in construction and design, economical to manufacture, extremely reliable in operation, not readily subject to malfunction or breakdown, requires a minimum of maintenance and servicing and is capable of handling different size workpieces, thereby affording increased production capacity and minimum down time of the equipment.

Yet a further important object of the present invention aims at the provision of a transport device of the previously mentioned type for transporting workpieces which are to be processed, typically at a welding station of a resistance welder, wherein the transport device is structured such that it is extremely versatile in transporting different size workpieces without the need to carry out any complicated alterations or change-over in the design of the transport device, thereby avoiding any need to shutdown the equipment whenever the equipment is intended to process different size workpieces.

Now in order to implement these and still further objects of the invention, which will become more readily apparent as the description proceeds, the transport device is manifested by the features that there is provided at least one endless chain which revolves above the workpiece bodies which are to be transported and moving in a predetermined transport direction along a feed plane. The endless chain has workpiece body-engagement members in the form of pawls articulated in spaced relationship from one another by means of pivot pins of the chain. Each of the pawls or pawl members has pawl arms extending to opposite sides of the related pivot pin. One pawl arm possesses a contact or impact surface intended to bear against the end of the workpiece body which is to be engaged by such pawl arm, and the other pawl arm has a control surface which bears against a guide rail which is stationarily arranged above the lower chain run of the endless chain which travels over at least two sprocket wheels. This guide rail is structured to have at both ends of a linear section two sections which extend in an arc-shaped configuration at the region of the sprocket wheels in such a manner that upon arrival of one pawl at the feed plane the pawl arm thereof which has the contact or impact surface is rocked in a controlled manner into a workpiece body-engaging position and that upon departure of such pawl out of the feed plane the contact surface of such pawl arm is retained in an essentially normal position with respect to the direction of transport of the workpiece bodies.

The advantage of the pawls or pawl members mounted to be pivotably movable on the endless chain resides in the fact that selective ones of the pawls can be brought into the engagement position with the workpiece bodies and the other pawls which are not in engagement can revolve freely between the workpiece bodies and the guide rail. A further advantage which is realized due to the mounting of the pawls to be pivotably mobile resides in the fact that in conjunction with the guide rail they are controlled in such a manner in the feed plane that they can be rocked into the engagement position with the workpiece bodies such that there is avoided striking of the pawls against the edges of the workpiece bodies, eliminating the formation of undesirable indentations, notches or other damage to the bodies, and also during the outbound movement or departure of the pawls from the feed plane they cannot hook into the edges of the workpiece bodies.

Since by virtue of the pivotal arrangement of the pawls on the chain it is possible to bring only predetermined ones of the provided pawls into engagement with the workpiece bodies, it is possible according to an advantageous construction to have the minimum mutual spacing of the pawl members from one another on the chain equal to the length of one pawl member. With this spacing the pawl members or pawls just fail to overlap one another at their ends when they are not in engagement with a workpiece body and located behind one another in the direction of chain travel. In any event it is possible to make the mutual spacing of the pawls smaller than the average length of the workpiece bodies which should be processed at such machine i.e., the pawl spacing can be selected to be at most equal to the smallest workpiece body-length, so that when processing longer workpiece bodies one or a number of the pawls travel freely above the workpiece body. In order to achieve that as to the pawls which revolve with the chain certain ones thereof come into engagement with the workpiece bodies and others travel freely, the pawls are advantageously constructed of steel, so that the guide rail which is arranged at the region of a current conductor in the form of a welding arm by means of which welding current is supplied to the welding rolls, retains the pawl arms having the contact surfaces of all of the pawls during the chain movement in a pivoted-out position and rocked-out of the feed plane by virtue of the magnetic field which builds-up about such current conductor. Furthermore, the pawl arm which is intended to be brought into engagement with a workpiece or workpiece body is advantageously pivoted away from the guide rail by the force of an element which overcomes the magnetic field, this element being advantageously arranged at the region of the arc-shaped infeed or arrival path of the pawls into the feed plane. This element may be beneficially in the form of an air nozzle connected with a compressed air conduit or line, the air nozzle being arranged externally and opposite the chain and the arc-shaped section of the guide rail and directing an air pulse in each instance against the rear face or side of one of the pawl arms carrying the control surface. Of course, there could also be utilized as the element for rocking or pivoting the pawls a mechanically functioning device, but air pulses can be most advantageously controlled by a central regulator or regulation device, and the air conduit furthermore occupies very little space.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic front view, partially in cross-sectional view, of the transport device with transport chains arranged to both sides of a Z-shaped guide rail and a welding arm arranged below such Z-shaped rail;

FIG. 2 is a schematic side view of the transport device showing the infeed side of the endless chain thereof looking in the direction of line I—I of FIG. 1; and FIG. 3 is a schematic side view of the transport device, showing the outfeed side of its endless chain.

DETAILED DESCRIPTION OF THE PREFERRED EMBODIMENTS

At this point it is mentioned that the transport device of the invention, which will be described in detail hereinafter, transports the workpieces or workpiece bodies which are to be welded up to the welding rolls of the resistance welder where overlapping edges of the bodies are welded and simultaneously further transports the workpiece bodies. The transport device interconnects the welding rolls with an infeed device, which does not constitute subject matter of the present invention. In the case of a resistance welding machine where, as previously mentioned, the workpieces or bodies are rounded or formed in a forming machine, the infeed device comprises a first transport system which transports the bodies, for the reasons previously mentioned at a greater feed or transport speed up to a transfer location to a second transport system which further conveys them at the welding speed, and which is the function of the transport device constituting the subject matter of the present invention. The upstream arranged transport system can also consist of an entrainment chain, but equally can merely comprise a cyclically operating feed device which delivers the workpiece bodies to the transport device which feeds the same at the welding speed. Since it is also conceivable that a welding machine is charged with bodies which are already formed or rounded there is only important the transport device which conveys the workpiece bodies at the welding speed.

Since the invention is concerned with the transport device of the type which feeds the workpieces to the welding station at a desired welding speed, there will only be disclosed in the description to follow details of such transport device. Since the construction of the resistance welding machine and other parts of the welding equipment are not crucial to understanding the details of the invention, it is unimportant to consider the same to any greater extent beyond that disclosed herein. It should be appreciated that the transport device can be used with many different constructions of resistance welding equipment where the aforementioned workpiece feed requirements should be satisfied, and hence, it is to be understood that the transport device of the invention is not otherwise limited as to its use with any specific type of resistance welding machine. Now the transport device shown in FIGS. 1 to 3 should be understood to be part of a resistance welding machine which, for the reasons just explained, has not been further shown in the drawings, other than there being illustrated in FIG. 1 in cross-section a substantially horizontally extending welding arm 1. Further, a Z-shaped guide rail or rail member 2 is arranged above the welding arm 1 and within which there are guided overlapping edges 3 and 4 of the workpieces or workpiece bodies 5. In the side views of FIGS. 2 and 3, taken substantially along the section line I—I of FIG. 1, there have been conveniently omitted the welding arm 1 and the Z-shaped rail 2 to preserve clarity in illustration.

Continuing, according to the arrangement shown in FIG. 1 a respective guide rail 6 and 7 is located to each side of the Z-shaped rail 2, and at each guide rail 6 and 7 there merges a chain guide 8 and 9, respectively, which in each instance is located at the outside of the associated guide rail 6 and 7, as shown. In the chain guide 8 there is guided the lower chain run 10a of a revolving endless chain 10 on which there are pivotably secured by means of the pivot pins 11 or equivalent structure the pawls or pawl members 12. During movement of the chain 10 the pawls 12 move below the guide rail 6.

In the chain guide or chain guide means 9 at the opposite side of FIG. 1 there is guided the lower chain run 13a of a revolving endless chain 13. Pivotably mounted on the endless chain 13 in spaced relationship from one another are a number of pawls or pawl members 15. These pawls are mounted in mutually spaced relationship at the chain 13 by means of pivot pins 14 and such pawls 15 are located below the guide rail 7 which is likewise visible in the showing of FIGS. 2 and 3. Furthermore, as will be seen from the illustration of FIG. 1, the chains 10 and 11 together with the pawls 12 and 15, defining workpiece body-engaging members, are of mirror-image construction with regard to the line of symmetry extending through the center of the welding arm 1. In FIGS. 2 and 3 there is only visible the chain 13 together with the pawls or pawl members 15. Each of these pawl members 15 have at opposite sides of the related pivot pin 14 or equivalent structure the extending pawl arms or arm members 16 and 17. The arm 16 has at the end thereof an impact or contact surface 18 by means of which the related pawl, when it comes into engagement with a workpiece body 5, bears against the end of such workpiece body.

The pawl arm 17 of the pawl 15 and which pawl arm is located rearwardly with respect to the feed direction of the workpieces or workpiece bodies 5, carries at its end a control surface 19 which is bounded by a front control surface-edge 20 and a rear control surface-edge 21, considered with respect to the feed direction of the workpieces 5.

Each pawl 15 bears by means of the control surface 19 of its pawl arm 17 on the underside of the guide rail 7 when such pawl engaged with a related workpiece body 5. The chain 13, which has only been schematically indicated in FIGS. 2 and 3 by a phantom line, travels over the sprocket wheel 22 shown in FIG. 2 and the sprocket wheel 23 shown in FIG. 3, in order to move the workpieces 5 from the left to the right side of FIG. 2. FIG. 3 illustrates the end of the transport device which merges with the right end of the transport device shown in FIG. 2, wherein FIG. 2 shows the arriving pawls engaging with the workpieces whereas FIG. 3 illustrates the end of the transport system where the pawls come out of engagement with the workpieces. The further part of the endless chain which has not been shown in the drawing is guided over further sprocket wheels.

The guide rail 7 is provided at its underside, between the sprocket wheel 22 of FIG. 2 and the sprocket wheel 23 of FIG. 3, with a linear section 7a along which there can slide the control surface 19 of a pawl 15 which is in engagement with a workpiece body 5. At the left side of the showing of FIG. 2 during the arrival of the pawl in the feed plane of the workpieces 5, the guide rail 7 has a curved or arc-shaped section 7b which is structured such that by virtue of the contact of the control surface-edge 20 at the rear pawl arm 17 it is possible to control the inward movement by means of such curved section 7b of the pawls 15 into the engagement position with the workpieces 5 in a manner that these workpieces are not struck and deformed by the pawls at their edges.

At the outfeed or delivery side of the guide rail 7 where the pawls move out of the engagement position, as illustrated for the portion of the transport device shown in FIG. 3, the guide rail 7 has a curved or arc-shaped section 7c against which bears the pawl arm 17 of each of the pawls 15 by means of the rear control surface-edge 21. This curved or arc-shaped section 7c of the guide rail 7 is structured such that upon departure of the pawls 15 out of the feed plane of the workpieces 5 the impact or contact surface 18 provided on each pawl arm 16 always retains its essentially vertical position. The transport direction, indicated generally in FIG. 3 by arrow T, thus forms a right angle with the contact or impact surface 18 of the related pawl or pawl member 15. With this control of the pawls there is achieved the result that the pawls which glide upwardly in a vertical direction away from the workpieces or workpiece bodies 5 can never hook at the edge of the related workpiece, which otherwise could lead to the formation of undesirable notches or indentations or other damage at such workpiece.

From the showing of FIG. 2 it will be apparent that the spacing of the pawls 15 on the chain 13 is not much greater than the length of a pawl 15. The minimum spacing of the pawls is equal to the length of one pawl. Additionally, it will be apparent from the illustration of FIG. 2 that between the guide rail 7 and a workpiece 5 there can freely revolve together with the chain 13 two pawls 15 which are not in engagement with a workpiece, these non-active pawls being rocked into a position which is essentially parallel to the associated guide rail 7. This position is assumed by these pawls due to a magnetic field which builds-up about the welding arm 1 through which there is conducted a welding current of high current intensity to the electrode roll (not shown) arranged at the end of such welding arm and about the remaining parts of the transport device located at the direct neighborhood of the welding arm, especially the guide rails. By means of this magnetic field the pawl arms 16 of all pawls 15 of the chain 13, and each of which arms has the aforementioned contract or impact surface 18, are also attracted against guide rail 7 at the deflection location of the chain at the sprocket wheel 22. Therefore, it is necessary to rock certain pawls which should come into engagement with a workpiece, by means of an air pulse emanating from an air nozzle 25 and directed against the back or rear face of the corresponding pawl arm 17. The air nozzle 25 or equivalent structure is arranged opposite the curved or arc-shaped section 7b of the guide rail 7, and the pawls which are thus rocked or pivoted by the air pulses are turned until the control surface-edge 20 of the corresponding pawl arm 17 comes to bear against such curved section 7b of the installation, as has been indicated in FIG. 2 with the illustrated different pivotal positions of the pawl shown at the vicinity of the curved section 7b of the guide rail 7. Depending upon the length of the workpieces which are to be welded by means of the resistance welding machine, it is possible to control by means of any suitable and therefore simply schematically illustrated control or regulation device 50 the delivery of the air pulses out of the air nozzle 25 for each second, third or fourth pawl in a most simple manner. In this way there can be achieved with one conveyor chain, the entrainment of members of which are normally held out of engagement with the workpieces by means of a magnetic field and can be brought into engagement with the workpieces or other material to be conveyed by an air pulse, an optimum accommodation of the machine to different sizes of the workpieces to be welded to one another, and the production capacity of the machine can be appreciably improved due to the omission of the otherwise required conversion of the machine by changing chains as previously explained.

Arranged externally of the transport chain 13 and opposite the curved section 7b of the guide rail 7 is a further guide 27 for the pawls of the transport chain, and on this further guide or guide means 27 there slide the pawl arms 16 at their rear face or side. Due to this arrangement the pawls 15 can be better guided through an angle of about 90° at the deflection location of the chain, until the guiding action is assumed by the control surface-edge 20 of the other pawl arm 17 in the event that a pawl is rocked by an air pulse emanating from the air nozzle 25 into the engagement location or position with the related workpiece 5. The air nozzle 25 is dispositioned at the region of the guide means 27, as shown.

As already has been heretofore explained, the conveyor chain 13 together with the pawls 15 engages the workpieces or workpiece bodies 5 as the same are infed by an upstream located conveyor or feed device which transports the workpieces arriving from a forming machine at a higher feed or conveying speed than the welding speed. With the illustrated exemplary embodiment this conveying or feed device has merely been shown by a conveyor chain 30 illustrated in phantom lines at the left-side of FIG. 2. This conveyor chain 30 is guided along an endless path over sprocket wheels 31 and 32 as well as over further sprocket wheels which have not been shown in the drawings and, additionally, carries entrainment fingers 33 or equivalent structure arranged at a uniform spacing from one another which come to bear on the not particularly designated rear edge of a workpiece 5 and extend transversely of such workpiece. The entrainment fingers 33 can be rapidly disconnected in any convenient manner and again mounted at another location on the chain 30 in order to vary the spacing of such entrainment elements from one another.

Between the conveyor chain 30 and the transport chain 13 having the pawls 15 there occurs a transfer of the workpieces at the region below the sprocket wheel 22. In order that such transfer is accomplished without any disturbing surges, it is desirable to coordinate to one another the speed of movement of each of the entrainment members or elements 15 and 31 which come into engagement with the workpieces at the transfer zone of the system. The chains 13 and 30 travel with different feed or conveying speeds. In order to properly calculate the transfer speed, the pawls should be rocked in a control manner into the engagement position with the related workpiece, and it is for this reason that the curved section 7b of the guide rail 7 has a special contour so that there can be influenced the peripheral speed at the outer end of the pawl arm 16 by means of the control surface-edge 20 of the pawl arm 17 and which edge 20 slides along such section 7b of the guide rail 7. Instead of using the conveyor chain 30 there could be employed another conveyor device for the feed of the workpieces to a location below the transport chain 13, and the construction and mode of operation of such conveyor device would be dependent upon the preceeding work or operating steps for the workpieces.

Since, as explained, the guide rail 6 and related chain 10 and the pawls 12 secured thereto are essentially of the same construction as the part of the transport device described and illustrated in FIGS. 2 and 3, it should be apparent that the operation thereof is identical to that disclosed, wherefore no further discussion is here needed.

While there are shown and described present preferred embodiments of the invention, it is to be distinctly understood that the invention is not limited thereto, but may be otherwise variously embodied and practiced within th scope of the following claims.

Accordingly, what I claim is:

1. A transport device for an electrical resistance welding machine for producing lengthwise seams at workpieces to be welded to one another, the transport device delivering the workpieces to the welding machine at a predetermined welding speed, said transport device comprising:
   at least one endless chain;
   means for mounting said endless chain for revolving movement adjacent the workpieces which are to be transported and moving in a predetermined direction of transport along a feed path;
   a guide rail stationarily arranged adjacent one run of said endless chain;
   pawls;
   means incorporating pivot pins for hingedly mounting the pawls at the endless chain in spaced relation from one another;

each pawl having a pair of pawl arms extending to opposite sides of its associated pivot pin;

one pawl arm of each pawl having a contact surface intended to bear against an end of the workpiece to be engaged by such pawl;

the other pawl arm of each pawl having a control surface bearing against said guide rail which is stationarily arranged adjacent said one run of said endless chain;

said mounting means for said endless chain comprising at least two sprocket wheels over which travels said endless chain;

said guide rail including a linear section and at each end of said linear section a respective section which extends in a substantially curved configuration at the region of a neighboring one of the sprocket wheels in such a manner that upon arrival of a pawl along a curved infeed path at the feed path the pawl arm having the contact surface is controllably rocked into its engagement position with a related workpiece and upon outfeed of the pawl out of the feed path the contact surface of the pawl arm retains its feeding position which is essentially perpendicular with respect to the direction of transport of the workpieces.

2. The transport device as defined in claim 1, wherein:

the spacing of the pawls on the endless chain is essentially equal to the length of a pawl.

3. The transport device as defined in claim 1, wherein:

the pawls are formed of steel;

there is a current conductor adapted to lead to a welding roll of the welding machine;

the guide rail being arranged at the region of the current conductor such that the magnetic field which builds-up about the current conductor attracts the contact surfaces of the pawl arms of all pawls during movement of the endless chain and retains such attracted pawls in a position pivoted out of the feed plane of the workpieces;

means for pivoting away from the guide rail with a force overcoming the magnetic field each pawl arm which is to be brougnt into engagement with a workpiece;

said pivoting means being arranged at the region of the curved infeed path of the pawls into the feed plane.

4. The transport device as defined in claim 3, wherein:

said pivoting means for pivoting predetermined ones of said pawls into an engagement position comprises air nozzle means connected with a compressed air conduit;

said air nozzle means being arranged externally of said endless chain and opposite the curved section of the guide rail at the infeed path;

said air nozzle means delivering an air pulse against a rear face of the pawl arm having the control surface and intended to be brought into engagement with a workpiece.

5. The transport device as defined in claim 1, wherein:

the contact surface of the one pawl arm and the control surface of the other of said pawl arms are oriented essentially at right angles with respect to one another;

the other pawl arm bearing with its entire control surface at the linear section of the guide rail;

said guide rail curved ends including an infeed end and an outfeed end;

said control surface having a forward control surface-edge, viewed with respect to the direction of feed of the workpiece, which bears against the curved section of the guide rail at said guide rail infeed end and a rear control surface-edge which bears against the curved section of the guide rail at said guide rail outfeed end.

6. The transport device as defined in claim 5, further including:

an additional curved guide arranged externally of the revolving endless chain at said guide rail infeed end;

the one pawl arm of each of the pawls sliding by means of a rear face located opposite its contact surface against said additional curved guide in order to controllably pivot the one pawl arm into the feed path before the front control surface-edge of the other pawl arm comes to bear against the guide rail.

7. A transport device for an electrical resistance welding machine for producing lengthwise seams at workpieces to be welded to one another, the transport device delivering the workpieces to the welding machine at a predetermined welding speed, said transport device comprising:

at least one endless chain;

means for mounting said endless chain for revolving movement adjacent the workpieces which are to be transported and moving in a predetermined direction of transport along a feed path;

a stationarily arranged guide rail;

pawls;

means for hingedly mounting the pawls on the endless chain in spaced relationship from one another;

each pawl having a pair of oppositely extending pawl arms;

one pawl arm of each pawl having a contact surface intended to bear against an end of the workpiece to be engaged by such pawl;

the other pawl arm of each pawl having a control surface bearing against said guide rail;

said guide rail including a linear section and at each end of said linear section a respective section which extends in a substantially curved configuration in such a manner that upon arrival of a pawl at the feed path the pawl arm having the contact surface is controllably rocked into its engagement position with a related workpiece and upon outfeed of the pawl out of the feed path the contact surface of the pawl arm retains its feeding position which is essentially normal with respect to the direction of transport of the workpieces.

8. A transport device for delivering workpieces at a predetermined speed, said transport device comprising:

means defining a feed path for workpieces;

a stationarily mounted guide rail disposed in spaced adjacent relation to said feed path;

an endless chain;

means mounting said endless chain for movement along a path including a run extending between said guide rail and said feed path;

pawls;

means mounting said pawls on said endless chain in spaced relationship from one another;

each pawl having a pair of oppositely extending pawl arms;

one pawl arm of each pawl having a contact surface intended to bear against an end of workpieces to be engaged by such pawl;

the other arm of each pawl having a control surface bearing against said guide rail;

said guide rail including a linear section having a leading end and a trailing end, and a curved section at said leading end of said linear section;

said curved section being of a curved configuration such as to define means for acting on each pawl arriving at said feed path to rock the contact surface of the respective pawl into an engagement position with a related workpiece which is essentially normal to said feed path, said pawl being formed of steel; and means associated with said guide rail for forming a magnetic field which attracts said pawl contact surfaces during movement of said endless chain between said guide rail and said feed path and pivots all pawls not engaged by a workpiece to out of the way positions.

9. The transport device of claim 8 together with:

means operable on each pawl for pivoting each pawl away from said guide rail with a force overcoming the magnetic field attraction of each pawl which is to be brougnt into engagement with a workpiece;

said last mentioned means being positioned adjacent said curved section.

10. The transport device of claim 9 wherein:

said last mentioned means includes an air nozzle connected with a compressed air source;

said air nozzle being positioned to deliver an air pulse against a rear face of a pawl arm having its control surface intend to engage a workpiece.

* * * * *